| United States Patent [19] | [11] Patent Number: 5,041,401 |
| Schoennagel et al. | [45] Date of Patent: Aug. 20, 1991 |

[54] THERMALLY STABLE NOBLE METAL-CONTAINING ZEOLITE CATALYST

[75] Inventors: Hans J. Schoennagel, Pennington, N.J.; Ying-Yen Tsao, Lahaska; Tsoung Y. Yan, Philadelphia, both of Pa.

[73] Assignee: Mobil Oil Corporation, Fairfax, Va.

[21] Appl. No.: 500,358

[22] Filed: Mar. 28, 1990

[51] Int. Cl.$^5$ .................... B01J 29/12; B01J 29/22; B01J 29/32
[52] U.S. Cl. .................................. 502/61; 502/66; 502/74
[58] Field of Search .................... 502/61, 85, 66, 74

[56] References Cited

U.S. PATENT DOCUMENTS

| 4,656,149 | 4/1987 | Jacobs et al. | 502/85 |
| 4,717,700 | 1/1988 | Venkatram et al. | 502/85 |
| 4,957,891 | 9/1990 | Sachtler et al. | 502/61 |

FOREIGN PATENT DOCUMENTS

| 119023 | 9/1984 | European Pat. Off. | 502/61 |
| 142352 | 5/1985 | European Pat. Off. | |
| 252705 | 1/1988 | European Pat. Off. | 502/61 |

OTHER PUBLICATIONS

"Chemical Anchoring of Platinum in Zeolites", by M. S. Tzou et al., *Applied Catalysis*, 20 (1986), pp. 231–238.

*Primary Examiner*—Carl F. Dees
*Attorney, Agent, or Firm*—Alexander J. McKillop; Charles J. Speciale; Malcolm D. Keen

[57] ABSTRACT

A zeolite catalyst composition having increased resistance to agglomeration and/or migration of its noble metal component at high temperatures and a method for preparing the catalyst composition are disclosed. The zeolite catalyst composition contains a non-framework multivalent metal oxide to stabilize the noble metal. The multivalent metal oxide, such as alumina, can be introduced into the zeolite component by diffusion, impregnation, ion-exchange, and/or calcination.

22 Claims, No Drawings

THERMALLY STABLE NOBLE METAL-CONTAINING ZEOLITE CATALYST

BACKGROUND OF THE INVENTION

This invention relates to a noble metal-containing zeolite catalyst exhibiting enhanced high temperature resistance to agglomeration of the noble metal component(s) and to a process for preparing such a catalyst.

Noble metal-containing zeolites have been described for the catalysis of a variety of chemical conversion processes, e.g., hydroisomerization, disproportionation, hydrocracking, reforming, etc. When an aged zeolite catalyst is oxidatively regenerated to burn off accumulated carbonaceous deposits, or "coke", there is a tendency for the noble metal to migrate from the zeolite channels and to agglomerate in larger particles. This reduces the dispersion and the surface area of the noble metal available for contacting the reactants. To remedy this problem a process referred to as rejuvenation is employed in which a source of halogen such as chlorine is used to redisperse the noble metal. Frequently, chlorine rejuvenation makes matters worse, and the noble metal migrates from the zeolite to the binder material which is associated with the zeolite. When the noble metal hydrogenation component is far removed from the active acid sites of the zeolite framework, the catalyst loses selectivity. Fresh catalyst performance is rarely, if ever, obtained after current rejuvenation processes.

SUMMARY OF THE INVENTION

It is an object of the invention to provide a noble metal-containing zeolite exhibiting enhanced resistance to high temperature-induced agglomeration of its noble metal component.

It is another object of the invention to provide a noble metal-containing zeolite in which the noble metal is associated with a multivalent metal oxide present within the pore channels of the zeolite.

It is a particular object of the present invention to prepare a noble metal-containing zeolite catalyst, e.g., a large pore zeolite such as zeolite, Y, X, L, mordenite, beta, etc., or an intermediate pore size zeolite such as ZSM-5, ZSM-11, ZSM-12, ZSM-23, ZSM-35, ZSM-38, ZSM-48, etc., in which the intrazeolitic noble metal component, e.g., platinum, palladium, iridium, rhodium, etc., with or without one or more non-noble metal promoters such as zinc, gallium, cobalt, molybdenum, tungsten, rhenium, etc., resists high temperature agglomeration due to being stabilized, or "anchored", within the zeolite by a non-framework multivalent metal oxide such as aluminum oxide, gallium oxide and/or indium oxide present within the zeolite pores.

It is yet another object of the invention to carry out a chemical conversion process, for example, isomerization, employing the foregoing thermally stable noble metal-containing zeolite catalyst.

In accordance with the aforesaid objects as well as other objects of the invention, a porous zeolite composition containing at least one noble metal component and exhibiting improved resistance of the noble metal component to agglomeration when the zeolite is exposed to high temperature is provided together with a method for obtaining the composition. The porous zeolite composition contains one or more non-framework multivalent metal oxides within the channels of the zeolite and a catalytically effective amount of one or more noble metals alone or associated with one or more non-noble metals, the presence of said multivalent metal oxide(s) resulting in a significantly increased resistance to agglomeration of the noble metal(s) at high temperature compared to substantially the same porous zeolite containing no appreciable amount of said non-framework multivalent metal oxide(s).

DESCRIPTION OF THE PREFERRED EMBODIMENTS

The zeolite containing component of the agglomeration resistant noble metal-containing zeolite catalyst of the present invention can be a large pore zeolite such as zeolite Y, rare-earth-exchanged zeolite Y, ultra-stable zeolite Y, de-aluminated zeolite Y, zeolite L, zeolite beta, ZSM-3, ZSM-4, ZSM-18, ZSM-20, a medium pore zeolite such as ZSM-5, ZSM-11, ZSM-5/ZSM-11 intermediate, ZSM-12, ZSM-23, ZSM-35, ZSM-38, ZSM-48, zeolite MCM-22, or other similar material.

Zeolite Y is described in greater detail in U.S. Pat. No. 3,130,007. The entire description contained within this patent, particularly the X-ray diffraction pattern of therein disclosed Zeolite Y, is incorporated herein by reference.

Zeolite L is described in U.S. Pat. No. 3,216,789. That description including the X-ray diffraction pattern of zeolite L, is incorporated by reference.

Zeolite beta is described in U.S. Pat. No. 3,308,069. That description, including the X-ray diffraction pattern of zeolite beta, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. Nos. 4,229,424. That description, and in particular the X-ray diffraction pattern of said compositions disclosed therein, is incorporated herein by reference.

ZSM-12 is described in U.S. Pat. No. 3,832,449. That description, and in particular the X-ray diffraction pattern disclosed therein, is incorporated by reference.

ZSM-18 is described in U.S. Pat. No. 3,950,449. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporated herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,234,231, the entire contents of which is incorporated herein by reference.

Zeolite MCM-22 is more particularly described in U.S. patent application Ser. No. 254,524 filed Oct. 6, 1988 as a continuation-in-part of U.S. patent application Ser. No. 98,176, filed Sept. 18, 1987 which is a continuation-in-part of U.S. patent application Ser. No. 890,268 filed July 29, 1986, all of these patent applications being herein incorporated by reference.

Zeolites generally comprise a framework of silicon, aluminum, and oxygen. Other elements such as boron, titanium, or iron can also be incorporated into the framework of a zeolite.

One or more noble metals are commonly incorporated into zeolites as hydrogenation component(s). The noble metal component(s) can be selected from the metals of Group VIII of the Periodic Table of the elements and include osmium, ruthenium, rhodium, iridium, palladium and platinum. Preferably, the noble metal employed herein is platinum, rhodium or iridium, and most preferably platinum. The metals can be present in any combination desired. The amount of noble metal present in the catalyst will in any given case be an effective amount; in general, amounts of noble metal(s) ranging from about 0.1 to about 5 percent, preferably from about 0.3 to about 2 percent and still more preferably from about 0.5 to about 1.0 percent, by weight of total zeolite can be used to good effect. One or more non-noble metals can also be present, e.g., Zn, Ga, Co, Mo, Ni, Ni, W, Re, etc., as promoters. The term "metal" as used herein broadly includes both the elemental form and any compound form of the metal.

Non-zeolite components of catalyst compositions include binders such as silica, alumina, or other non-zeolitic materials.

The present invention is especially applicable to dual function catalysts such as zeolite beta, de-aluminized USY, ZSM-5, ZSM-11, ZSM-23, and zeolite MCM-22 which have relatively low alpha values. Excess zeolite activity is undesirable for such processes as reforming, dewaxing, and isomerization wherein cracking is to be avoided. Zeolite cracking activity, as characterized by the alpha value, is related to the number of acid sites, i.e., the framework aluminum sites. Therefore, zeolites formulated with a high silica/alumina ratio will have lower cracking activity. Reduction of acidity for already-prepared zeolites can be accomplished by several known treating methods: steaming, acid leaching, framework substitution, cation exchange, and high temperature calcination. The first three treatments are intended to remove aluminum from their framework sites either to solution or to external locations of zeolite. Among these techniques, steaming is the easiest to implement. The cation exchange approach is used to replace protons by basic cations. This technique is currently used to prepare platinum on Ba/Zeolite L for reforming naphtha. None of these treatments provide effective anchoring sites for platinum or other noble metal. Another treating method for reducing catalyst acidity, high temperature calcination, is only usable for those catalysts which can withstand high temperatures without losing crystallinity.

The disadvantage, it has been found, is that a noble metal hydrogenation component(s) such as platinum, which is incorporated into the zeolite channels, is only weakly bound to the silica. Consequently, the noble metal atoms can readily migrate and agglomerate during catalyst regeneration and do, in fact, do so.

It has been discovered that noble metal components of zeolite catalysts are more strongly bound to nonzeolitic multivalent metals occupying the zeolite pores, or channels, than to any of the zeolitic framework components or to the binder material with which the zeolite may be composited. Platinum or other noble metal will, in fact, migrate out of the channels of a highly silicaceous zeolite onto an alumina rich binder. Hence, the present invention contemplates a way of incorporating alumina (or other stabilizing metal oxide component) into the channels of a zeolite, but because it is not zeolitic framework alumina, it does not alter the zeolite's acid-catalysis activity. The non-framework metal oxide serves to bind the noble metal without, however, affecting the catalytic properties of the zeolite in any appreciable way. Hence, the method of the present invention can be usefully employed in those applications where a low alpha value is desired or required. Hydroisomerization, for example, requires both acid and hydrogenation functions in the zeolite catalyst. Moreover, the acid component of the zeolite framework (e.g., framework aluminum) must be in proximity to the hydrogenation component (e.g., platinum) so that olefinic species can be rehydrogenated to isoparaffins without being cracked to light products.

A variety of multivalent metal oxides are suitable as stabilizing components of the zeolite catalyst compositions herein. Although the mechanism by which these oxides achieve stabilization (considered as resistance of the noble metal to agglomeration or migration at high temperatures) is not known with certainty, it has been speculated that they serve as "anchoring" sites for the noble metal preventing or minimizing its tendency to agglomerate and/or migrate from the zeolite. Regardless of the actual mechanism involved, the fact remains that the presence of the multivalent metal oxide within the pores or channels of the zeolite effectively inhibits noble metal agglomeration/migration.

Examples of multivalent metal oxide stabilizing components which can be used to good effect include oxides of metals of: Group IIA such as magnesium, barium and calcium; Group IVB such as zirconium; and, Group IIIA such as aluminum, gallium and indium. The Group IIIA metal oxides are preferred and of these, the aforementioned oxides are particularly preferred.

Investigations so far with platinum-containing zeolite beta have demonstrated an order of preference for the oxides of these metals as follows: In>Ga>Al>Ba>Mg>Ca>Zr. It should be noted, however, that some other order of preference might apply in the case of other zeolites and/or other noble metal components.

The amounts of metal oxide stabilizing component required for effective noble metal agglomeration/migration resistance can vary within relatively large limits and in general will be related to the nature and amount of the particular noble metal employed, the specific zeolite utilized, the conditions of the conversion process, particularly the temperature, in which the zeolite is employed, the specific metal oxide stabilizing component utilized and other factors apparent to those skilled in the art. Specific amounts of metal oxide stabilizing components can be readily determined in a particular case employing routine experimentation. In the case of zeolite containing from about 0.05 to 5 weight percent noble metal and preferably 0.2 to 1 weight percent platinum, a mole ratio of nonzeolitic oxide (e.g. aluminum oxide) to noble metal of from about 1:1 to 100:1, and preferably from about 4:1 to about 20:1, is generally effective.

The invention herein contemplates a variety of methods to incorporate alumina and/or other stabilizing metal oxide(s) into the zeolite channels. Some of the methods achieve the addition of aluminum by ion exchange or gaseous diffusion. Another method, high temperature calcination, can be employed with those zeolites capable of withstanding temperatures between 600° C.–1000° C. The latter method dislodges framework aluminum and oxidizes it to form intrazeolitic (i.e. non-framework) aluminum oxide. Hence, with respect to high temperature calcination, the addition of aluminum is preferable, but not necessary for the stabilization of noble metals. Unlike framework aluminum, which provides acidity and catalyst activity but does not bind noble metal atoms, the non-framework intrazeolitic alumina does not provide acidity or catalyst activity but does bind noble metals.

Various methods of the present invention are described below. While platinum is used to exemplify the methods, it should be understood that other noble metals are also contemplated therein. When calcining is discussed it should be remembered that the severity of calcining is related to the temperature, moisture content, and duration of heating. Thus, a higher calcining temperature requires a shorter heating time to achieve a predetermined severity.

Gaseous diffusion can be used as a method of incorporating non-zeolitic alumina or other trivalent metal oxide species into the channels of a zeolite. A zeolite in the ammonium or hydrogen form is exposed to a dry aluminum chloride gas, e.g., at from about 185° C. to about 400° C. The aluminum chloride gas is deposited to the desired level. The catalyst is subjected to conditions effecting the hydrolysis of the aluminum chloride component followed by calcination in air at from about 700° C. to the maximum tolerable temperature to provide aluminum oxide. The maximum tolerable temperature is the upper limit of the temperature range at which the zeolite undergoes no more than 50% loss of crystallinity. For ZSM-5 the maximum tolerable temperature is about 1000° C., for zeolite beta it is about 900° C., and for MCM-22 it is about 1200° C. The catalyst can then be formed by, for example, extrusion methods, with or without a binder. After the catalyst has undergone treatment and forming, platinum is then ion exchanged to the desired level by conventional techniques. The catalyst is then dried in air at about 350° C.

Another useful technique employs impregnation. Thus, the selected zeolite can be impregnated with a solution of a nitrate, or other soluble aluminum salt, then calcined in air to convert the aluminum salt to alumina. Following ion-exchange with platinum cations to the desired level, the catalyst is calcined and shaped as in the gaseous diffusion method referred to above. If desired, the small amount of aluminum at the outer surface of the zeolite can be washed away with dilute acid.

Yet another useful procedure for incorporating the metal oxide stabilizing component utilizes ion exchange techniques which in themselves are known. Thus, e.g., a steamed zeolite extrudate with or without binder is ion-exchanged with aluminum cation and then calcined at appropriate temperatures to convert the aluminum to alumina. The catalyst is then ion exchanged with platinum cations to the desired level. Considering the relatively large size of hydrated aluminum cations, the effectiveness of this procedure for introducing non-zeolitic alumina into the zeolite is altogether surprising.

Calcination at sufficiently high temperatures in air or inert atmosphere is necessary to convert the above-mentioned metal to their oxides: cationic forms of the metals produced by ion exchange alone are not effective as stabilizing agents.

Another specific method for providing non-zeolitic metal oxide stabilizing component, i.e. calcination, is believed to produce this material from the structure of the zeolite itself. Although calcination has been a known method to reduce catalytic cracking activity of certain zeolites, its use as part of a method to increase the thermal stability of noble metals in zeolites is both novel and unexpected. Suitable calcination conditions include a temperature of from about 600° C. to the maximum tolerable temperature, preferably from about 700° C. to about 950° C., for a period of from about 0.5 to about 10 hours, preferably from about 1 to about 4 hours in a flowing gas of nitrogen, air, flue gas, or other suitable environment. At least a trace amount of water should be present during calcination to generate the intrazeolitic oxide. Water content should not exceed 100 ppm, however. The range of water present in the high temperature calcining stabilizing method should be between 1 and 100 ppm water, preferably 2 to 50 ppm and more preferably 4 to 30 ppm.

The calcining method of the present invention reduces zeolite alpha in proportion to the severity of the calcination. A higher temperature will reduce alpha value more than a lower temperature, all other factors being equal.

When alpha value is examined, it is noted that the alpha value is an approximate indication of the catalytic cracking activity of the catalyst compared to a standard catalyst and it gives the relative rate constant (rate of normal hexane conversion per volume of catalyst per unit time). It is based on the activity of the highly active silica-alumina cracking catalyst taken as an alpha of 1 (Rate Constant = 0.016 sec$^{-1}$). The alpha test is described in U.S. Pat. No. 3,354,078; in the *Journal of Catalysis*, vol. 4, . 527 (1965); vol. 6, p. 278 (1966); and vol. 61, p. 395 (1980), each incorporated herein by reference as to that description. The experimental conditions of the test used herein include a constant temperature of 538° C. and a variable flow rate as described in detail in the *Journal of Catalysis*, vol 61, p. 395.

Alpha provides a measure of framework alumina. The reduction of alpha indicates that a portion of the framework aluminum is being lost. It is believed that when alpha reduction is accomplished by the high temperature calcination method of the present invention this portion of aluminum is dislodged from the framework and thereupon takes up residence within the pores of the zeolite as intrazeolitic (i.e. non-framework) alumina. The reduction of alpha value should be at least 50%, preferably 70% and more preferably 90%. It should be noted, though, that alpha reduction by other methods, such as steaming, does not achieve the improved noble metal agglomeration/migration resistance of the present invention.

These metal oxide incorporation procedures described above are applicable to stabilization of noble metals on all zeolites such as ZSM-5, MCM-22, HY, REY, REX, ZSM-11, ZSM-12, mordenite, erionite, etc. The bifunctional catalysts, e.g., Pt/zeolite beta, Pd/HY, Pt/ZSM-5, Pt/ZSM-12 are useful in the catalysis of processes such as hydroisomerization, reforming, hydrocracking, hydrotreating, dehydrocyclization and dimerization.

The following examples provide additional details with respect to the present invention.

By way of simulating the agglomeration of noble metal which occurs during the high temperature burn-off of accumulated coke on a zeolite, wet air sintering is carried out at about 540° C. for 16 hours at about 14 torr partial pressure of water on a platinum-containing zeolite beta. Platinum dispersion is measured by hydrogen chemisorption technique and is expressed in terms of H/Pt ratio. The higher the H/Pt ratio, the higher the platinum dispersion. For example, a freshly prepared Pt/zeolite beta extrudate had an H/Pt ratio of 1.33. After wet air sintering the H/Pt ratio dropped to about 0.19. This is comparable to the reduction in platinum dispersion which occurs during catalyst regeneration by coke burn off.

Zeolites beta and USY of the examples are available in the art and can be prepared in accordance with known procedures.

EXAMPLES 1 AND 2

Zeolite beta was prepared in accordance with known methodology. The as-synthesized zeolite beta had a silica/alumina ratio of 37. It was heated at 450° C. in nitrogen for 4 hours and than at 530° C. in air for 4 hours. It was then exchanged with 1 M ammonium chloride solution. The zeolite possessed an alpha value of 640 at this point.

The zeolite was then divided into two portions. The first portion (Example 1) was calcined in flowing dry nitrogen (10 cc/min/gram catalyst) with the temperature raised at the rate of 10° C./min to 900° C. It was held at 900° C. for 1 hour. It should be noted that the "dry" nitrogen of this and the following examples contained a trace amount of water (1 to 10 ppm). After calcination the zeolite had an alpha of 65. It was then exchanged with a platinum salt, $Pt(NH_3)_4(NO_3)_2$, in accordance with known conventional methods of ion exchange, and then heated in dry air with the temperature being raised at 0.5° C./min to 350° C., and held at 350° C. for 4 hours. The resulting zeolite had a platinum content of 0.59% and an H/Pt ratio of 1.00.

To simulate the agglomeration effect of decoking the zeolite was then heated to 540° C. (1004° F) in wet air for 64 hours. The resulting zeolite had an H/Pt ratio of 0.53.

The second portion of the ammonium exchanged zeolite, (i.e. Example 2) was calcined in dry nitrogen at the above-mentioned flow rate and rate of temperature increase to a maximum temperature of 800° C. and was held at 800° C. for 2 hours. The resulting zeolite had an alpha value of 160. The platinum exchange and air drying steps were carried out as for Example 1. The resulting zeolite had a platinum content of 0.60% and an H/Pt ratio of 1.04.

After the wet air treatment to simulate the agglomeration of a coke burn-off the zeolite retained an H/Pt ratio of 0.60.

EXAMPLES 3, 4 AND 5

A sample of zeolite beta was synthesized in accordance with known methods. It had a silica/alumina ratio of 32.

This sample was heated to 450° C. in nitrogen for 4 hours and to 500° C. in air for 24 hours. It was then exchanged with 1 M ammonium chloride solution in accordance with known ion exchange methods. Following this, the resulting zeolite had an alpha value of 616.

This zeolite sample was divided into two portions. The first portion (Example 3) was calcined in flowing dry nitrogen (10 cc/min/gram catalyst) with the temperature being raised 10° C./min to 700° C. and maintained at 700° C. for 1 hour. After calcining the zeolite had an alpha value of 237. It was then exchanged with a platinum salt, $Pt(NH_3)_4(NO_3)_2$, by known and conventional methodology and treated in dry air by heating at the rate of 0.5° C./min to 350° C. and maintaining the 350° C. temperature for 4 hours. The resulting zeolite had a platinum content of 0.61% and an H/Pt ratio of 1.18.

To test the resistance to agglomeration the zeolite was treated with wet air at 540° C. for about 16 hours. The resulting zeolite had an H/Pt ratio of 0.50.

The second portion (Example 4) was calcined in flowing dry nitrogen (10 cc/min/gram zeolite) by heating at 10° C./min to 850° C. and maintaining the 850° C. temperature for 1 hour.

The resulting zeolite had an alpha of 134. It was then exchanged with platinum in the same manner as in Example 3. The zeolite after platinum exchange had a platinum content of 0.64% and an H/pt ratio of 0.80.

This 850° C. calcined sample was again divided into 2 portions. A first portion (Example 4 continued) was treated with wet air as in Example 3. The resulting zeolite had an H/Pt ratio of 0.50. The second portion of the 850° C. calcined sample (Example 5) was tested in a standard process for dewaxing vacuum gas oil wherein it accumulated a coke deposit. The zeolite was decoked by heating to 450° C. and the resulting zeolite had an H/Pt ratio of 0.50.

It can be seen that the wet air treatment of the zeolite of Example 4 results in the same reduction of the H/Pt ratio as the decoking of the same zeolite in Example 5. Comparison of Examples 4 and 5 confirm the reliability of the wet air treatment as a way of simulating agglomeration of noble metal occurring in decoking operations.

EXAMPLE 6

A zeolite beta was synthesized in accordance with known methodology and had a silica/alumina ratio of 37. It was exchanged with ammonium chloride and then heated in nitrogen at 450° C. for 4 hours, and then in air at 500° C. for 16 hours. The resulting zeolite had an alpha value of 640.

It was then exchanged with platinum in accordance with standard procedures as applied in the previous examples and then heated in dry air at 0.5° C./min to 350° C. and maintaining the 350° C. temperature for 4 hours. The resulting zeolite had a platinum content of 0.59% and an H/Pt ratio of 1.38.

After wet air treatment to simulate the agglomeration of decoking, the zeolite had an H/Pt ratio of 0.18.

EXAMPLE 7

A zeolite beta was synthesized in accordance with known methodology and ammonium exchanged. It was then treated with 100% steam at 538° C. for 10.5 hours to reduce its alpha value. After steaming the zeolite had an alpha of 58.

It was then platinum exchanged by standard methodology as in the previous examples and heated in dry air at 2° C./min up to 350° C. whereupon the 350° C. temperature was maintained for 3 hours. The resulting zeolite had a Pt content of 0.65% and an H/Pt ratio of 1.30.

After wet air treatment to simulate the agglomeration produced by decoking, the zeolite had an H/Pt ratio of 0.20.

Examples 6 and 7 show that steaming (Example 7) can be used to reduce zeolite alpha as compared with unsteamed zeolite beta (Example 6). However, when compared with the calcination method of examples 1 to 5, neither of the uncalcined zeolites (Examples 6 and 7) retain the high H/Pt ratios after agglomeration by wet air treatment. The steamed zeolite (Example 7) had an H/Pt ratio of only 0.20 after wet air treatment. The calcination method of the present invention resulted in H/Pt ratios of from 2.1 to 3.1 times higher after wet air treatment, indicating a significantly better platinum dispersion (i.e. less agglomeration) after wet air treatment or decoking, and therefore a higher thermal stability.

EXAMPLES 8, 9, AND 10

Three equivalent quantities of $NH_4+$/zeolite beta were exchanged alternatively with Group IIIA metal compounds, i.e., aluminum nitrate, gallium nitrate, and indium nitrate, respectively, without calcining and were then exchanged with a noble metal compound, i.e., $Pt(NH_3)_4(NO_3)_2$, and dried in air at 350° C. The H/Pt ratios of the three freshly treated quantities of the zeolite were measured, after which the quantities were sintered in wet air at 540° C. for 16 hours, and remeasured for H/Pt ratios. The results are set forth in Table 1.

TABLE 1

| | Uncalcined Catalyst | | | |
|---|---|---|---|---|
| | Group IIIA Stabilizer | Pt | (H/Pt) Ratio | |
| Example | Content | Content | Fresh | Wet Air Sintered |
| 8 | Al (0.3%) | 0.68% | 1.19 | 0.19 |
| 9 | Ga (1.0%) | 0.98% | 1.27 | 0.05 |
| 10 | In (1.5%) | 0.81% | 1.24 | 0.08 |

EXAMPLES 11, 12 AND 13

Three equivalent quantities of $NH_4+$/zeolite beta were exchanged alternatively with Group IIIA metal compounds, i.e., aluminum nitrate, gallium nitrate, and indium nitrate, in substantially the same manner as in Example 8, 9, and 10, respectively. The quantities were then calcined in air at 800° C. for 16 hours, then exchanged with a noble metal compound, i.e., $Pt(NH_3)_4(NO_3)_2$ and heated in dry air at 350° C. The H/Pt ratios of the three freshly treated quantities of zeolite were measured, after which the quantities were sintered in wet air at 540° C. for 16 hours, and remeasured for H/Pt ratio. The results are set forth in Table 2.

TABLE 2

| | Calcined Catalyst | | | |
|---|---|---|---|---|
| | Group IIIA Stabilizer | Pt | (H/Pt) Ratio | |
| Example | Content | Content | Fresh | Wet Air Sintered |
| 11 | Al (0.3%) | 0.61% | 0.77 | 0.58 |
| 12 | Ga (1.0%) | 0.64% | 0.76 | 0.75 |
| 13 | In (1.5%) | 0.67% | 0.86 | 1.03 |

A comparison of the data of Tables 1 and 2 shows that Group IIIA metals in their exchanged cationic form are not effective for stabilizing noble metal(s), specifically platinum. Only their oxides have been shown to be beneficial, hence the necessity of calcining the exchanged catalyst, preferably in air. Moreover, the ability of the Group IIIA oxides to stabilize noble metals increases with the atomic weight of the Group IIIA metal: indium oxide is a better agglomeration/migration inhibitor than aluminum oxide.

EXAMPLES 14, 15 AND 16

A sample of zeolite USY was provided and exchanged with 1 M ammonium chloride. The resulting $NH_4+$/USY had an alpha value of 109. This sample was then divided into three portions.

Portion 1 (Example 14) was calcined in dry air (i.e. air with only a trace amount of water) by raising the temperature at the rate of 10° C./min up to 900° C., and maintaining the 900° C. temperature for 16 hours. The calcined portion 1 had an alpha value of 5.

Portion 1 was then platinum exchanged by known methodology and heated in air at 350° C. for 4 hours. The resulting zeolite had a platinum constant of 0.55% and an H/Pt ratio of 1.46.

After the sintering treatment at 540° C. for 16 hours with wet air containing 14 torr of water, the H/Pt ratio of portion 1 dropped to 0.62.

Portion 2 (Example 15) was treated exactly the same as portion 1 except that the air calcination temperature was 850° C., after which the alpha value was 10.

After platinum exchange and heating to 350° C. the zeolite had a platinum content of 0.51% and an H/Pt ratio of 1.28.

Portion 2 was then sintered in wet air, and the resulting zeolite had an H/Pt ratio of 0.54.

Portion 3 (Example 16) was treated with 100% steam at 650° C. for 16 hours, after which it had an alpha value of 4.

Portion 3 was then exchanged with aluminum nitrate, after which it had an alpha value of 12.

It was then exchanged with platinum and heated in air at 350° C. for 4 hours. The alpha value of the portion 3 zeolite had a platinum content of 0.60% and an H/Pt ratio of 1.14 at this stage.

After wet air sintering under the same conditions as in Examples 14 and 15, the portion 3 zeolite had an H/Pt ratio of 0.08.

Example 16 illustrates that even with the addition of aluminum by ion-exchange the substitution of steaming to reduce alpha value in the initial treatment step does not accomplish the same stabilization results as the calcination method of the present invention. Although steaming did reduce alpha value in Example 16 from 109 to 4, the noble metal, platinum, was not adequately stabilized. The zeolite portions of Examples 14 and 15 maintained about 42% of their H/Pt ratios after the agglomeration test by wet air sintering, whereas the zeolite portion of Example 16 maintained only about 7% of its H/Pt ratio.

What is claimed is:

1. A zeolite catalyst composition comprising (a) a zeolite component, (b), a non-framework multivalent metal oxide component occupying the pores of the zeolite, said non-framework multivalent metal oxide being incorporated into the pores of the zeolite component by a method which includes calcining at a temperature of at least about 600° C. in an atmosphere containing from about 1 to 100 parts per million of water, and (c) a noble metal component, the presence of component (b) imparting significantly increased resistance to agglomeration and/or migration of component (c) when the catalyst composition is subjected to elevated temperature compared to the catalyst composition lacking (b).

2. The catalyst of claim 1 wherein the zeolite component is an intermediate pore size zeolite.

3. The catalyst of claim 1 wherein the zeolite component is selected from the group consisting of ZSM-5, ZSM-3, ZSM-4, ZSM-11, ZSM-12, ZSM-18, ZSM-20, ZSM-23, ZSM-35, ZSM-38, ZSM-48, zeolite beta, zeolite MCM-22, zeolite Y, zeolite USY, zeolite L, zeolite X, and mordenite.

4. The catalyst of claim 1 wherein the zeolite is a large pore size zeolite.

5. The catalyst of claim 1 wherein the zeolite component contains at least one framework element other than, or in addition to, aluminum.

6. The catalyst of claim 1 wherein the zeolite component contains at least one framework element selected from the group consisting of boron, titanium, iron, and any combination thereof.

7. The catalyst of claim 1 wherein the noble metal is at least one metal selected from the group consisting of platinum, palladium, iridium and rhodium and any combination thereof.

8. The catalyst of claim 1 wherein the noble metal is associated with at least one non-noble metal.

9. The catalyst of claim 1 wherein the non-framework multivalent metal oxide is selected from the group consisting of an oxide of indium, gallium, aluminum, barium, magnesium, calcium, and zirconium.

10. The catalyst of claim 1 wherein the non-framework multivalent metal oxide is an oxide of a Group IIIA metal selected from the group consisting of aluminum, gallium and indium.

11. The catalyst of claim 1 wherein the noble metal is present at a level of from about 0.05 to about 5.0 weight percent of the zeolite.

12. The catalyst of claim 1 wherein the mole ratio of the non-framework multivalent metal oxide to the noble metal is from about 1:1 to about 100:1.

13. The method of claim 1 wherein the mole ratio of the non-framework multivalent metal oxide to the noble metal is from about 4:1 to about 20:1.

14. A method for preparing a zeolite catalyst composition containing at least one zeolite component and at least one noble metal component and exhibiting improved resistance of the noble metal component to agglomeration and/or migration when the zeolite composition is exposed to high temperature which comprises:

a) introducing a non-framework multivalent metal oxide component into the press of the zeolite component by a method which includes calcining at a temperature of at least about 600° C. in an atmosphere containing from about 1 to 100 parts per million of water; and, b) introducing a noble metal component into the zeolite component, the presence of said non-framework multivalent metal oxide component resulting in a significantly increased resistance to agglomeration and/or migration of the noble metal component at high temperature compared to a zeolite catalyst composition containing no appreciable amount of non-framework multivalent oxide.

15. The method of claim 14 wherein the non-framework multivalent metal oxide is introduced into the zeolite component as the halide followed by conversion of the halide to the corresponding oxide.

16. The method of claim 14 wherein the non-framework multivalent oxide is alumina and said alumina is introduced into the zeolite component as aluminum chloride followed by hydrolysis and calcination to provide non-framework alumina.

17. The method of claim 14 wherein the non-framework multivalent metal oxide is introduced into the zeolite component by multivalent metal cation exchange followed by conversion of the multivalent metal cation to the corresponding oxide.

18. The method of claim 14 wherein non-framework multivalent metal is introduced into the zeolite component by cation exchange with a metal cation selected from the group consisting of aluminum cation, gallium cation and indium cation followed by conversion of the cation to the corresponding oxide.

19. The method of claim 14 wherein the non-framework multivalent metal oxide is introduced into the zeolite component by impregnating the zeolite with a soluble source of the metal followed by conversion of the metal to its oxide.

20. The method of claim 14 wherein the non-framework multivalent metal oxide is introduced into the zeolite component by calcining the zeolite component under conditions resulting in removal of framework metal, the removed metal taking up residence in the zeolite as non-framework metal oxide.

21. The method of claim 14 wherein the zeolite component contains framework aluminum and non-framework alumina is introduced into the zeolite component by calcining the zeolite under conditions which remove at least some framework aluminum, the removed aluminum taking up residence in the zeolite as non-framework alumina.

22. The method of claim 14 wherein the non-framework multivalent metal oxide is introduced into the zeolite component by calcining the zeolite component under conditions resulting in at least a 50% reduction in alpha value of said zeolite component.

* * * * *

UNITED STATES PATENT AND TRADEMARK OFFICE
CERTIFICATE OF CORRECTION

PATENT NO. : 5,041,401
DATED : 8/20/91
INVENTOR(S) : Hans J. Schoennagel et al.

It is certified that error appears in the above-identified patent and that said Letters Patent is hereby corrected as shown below:

Col. 11, Line 6, before "composition" delete "catalyst"

Col. 11, Line 57, delete "method" add --catalyst--

Col. 12, Line 5, Delete "press" add --pores--

Signed and Sealed this

Twenty-second Day of December, 1992

Attest:

DOUGLAS B. COMER

*Attesting Officer*      *Acting Commissioner of Patents and Trademarks*